March 12, 1935. M. P. YOUKER Re. 19,500

NATURAL GAS CONVERSION PROCESS

Original Filed May 1, 1925

INVENTOR
Malcolm P. Youker.

Reissued Mar. 12, 1935 Re. 19,500

UNITED STATES PATENT OFFICE 19,500

NATURAL GAS CONVERSION PROCESS

Malcolm P. Youker, Bartlesville, Okla.

Original No. 1,800,586, dated April 14, 1931, Serial No. 27,234, May 1, 1925. Application for reissue April 6, 1933, Serial No. 665,216

6 Claims. (Cl. 196—10)

Figure 1:
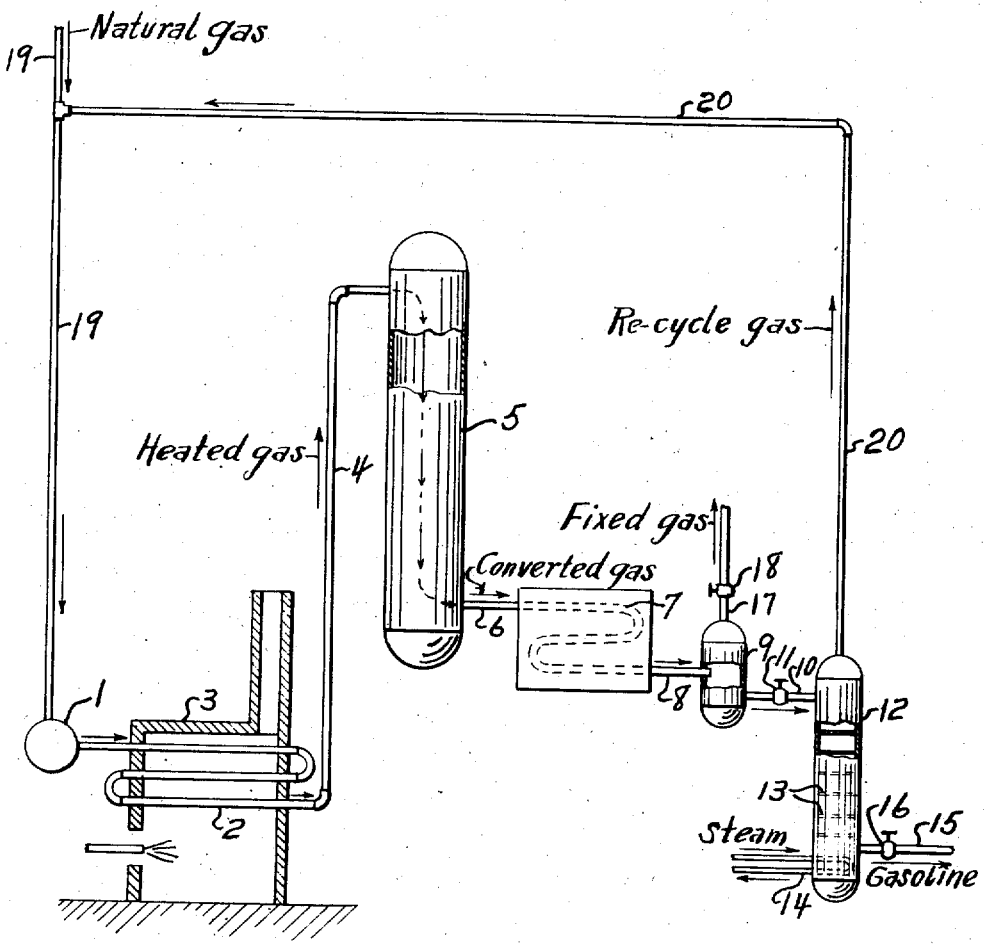

This invention relates to the conversion of highly volatile hydrocarbon constituents of natural gas into comparatively less volatile hydrocarbon liquids. An object of my invention is to change the molecular arrangement of carbon and hydrogen in some of the constituents of natural gas to produce gasoline. By my new process, this and other desirable advantages are obtained. My invention will be more fully understood from the following description taken in conjunction with the accompanying drawing, in which:

The figure illustrates diagrammatically in side elevation, one form of apparatus by which my new process may be carried out.

Referring to the drawing, the numeral 1 designates a pump which operates to pump either liquid or gas or a mixture of both through a heating coil 2, which is mounted in a furnace 3. A pipe 4, leads from the outlet of heating coil 2, into the top of a vertical cylindrical closed vessel 5. A pipe 6, leads from the bottom of the vessel 5, into a condensing worm 7. A pipe 8 leads from the outlet of condenser worm 7 into a closed cylindrical vessel 9. A pipe 10 in which is mounted a valve 11, leads from the bottom of vessel 9, into the top of a fractionating column 12. Perforated bubbling plates 13, are disposed in fractionating column 12. A heating coil 14, which is in communication with a supply of steam is disposed in the bottom of fractionating column 12. A pipe 15 in which is mounted a valve 16, leads from the bottom of fractionating column 12, to storage tanks which are not shown. A vent pipe 17, in which is mounted a valve 18, leads from the top of vessel 9. A pipe 19 which is in communication with a supply of natural gas leads to the intake of pump 1. A pipe 20 leads from the top of fractionating column 12 into pipe 19.

The apparatus shown in the drawing will be operated to carry out my new process as follows:

Natural gas, in either liquefied or gaseous state, will be continuously delivered through pipe 19 to the pump 1, and will be forced by pump 1, through the heating coil 2, the pipe 4, the vessel 5, the pipe 6, the condensing worm 7, and the pipe 8 into the vessel 9. This gas in passing through the heating coil 2 will be heated to a temperature above 500° F. and preferably above 750 degrees Fahrenheit. The rate at which gas will be pumped through the heating coil and the closed vessel 5 into the condenser worm 7 will be such that after this gas has been heated in the heating coil 2, such gas will remain in such heated condition in the vessel 5 for an appreciable period of time, preferably in excess of two minutes, before flowing into the condenser worm 7. A part of the gas which will pass from the vessel 5, through the pipe 6 and condenser worm 7, will be condensed in the condenser worm 7, and the resulting liquid and gas will flow thence through the pipe 8, into the vessel 9. Gas which will collect in the vessel 9 will be continuously withdrawn through the pipe 17, and the valve 18, while liquid which will gather in the vessel 9 will be continuously delivered thence through the pipe 10 and the valve 11, into the top of the fractionating column 12. A part of the liquid which will flow into the top of the fractionating column will flow down over bubble plates 13 and will collect in the bottom of fractionating column 12. Steam will be passed through the heating coil 14, which will heat and vaporize a part of the liquid which will gather in the bottom of the fractionating column 12 and vapors thus produced will rise through the fractionating column and will pass thence through the pipe 20, into the pipe 19 where such vapors will mingle with the natural gas which will flow through the pipe 19 to the pump 1, to be processed. Gasoline will be withdrawn from the bottom of the rectifying column through the pipe 15, and the valve 16. The volatility of the gasoline thus obtained will be regulated by regulating the quantity of heat supplied to the liquid in the bottom of the fractionating column by means of the heating coil 14. Raising the temperature of the liquid which will gather in the bottom of the fractionating column will decrease the volatility of the gasoline obtained and vice versa. The whole system, including the supply of natural gas which is to be processed, may be held under substantially the same pressure save for frictional losses; however, I will preferably maintain that part of the system which is intercommunicating between the pump 1, and the valve 11, under a pressure in excess of 500 pounds per square inch, and in excess of the pressure maintained in the remainder of the system.

The molecular structure of the highly volatile natural gas which will be heated in heating coil 2, and which will remain in such heated condition and under high pressure for an appreciable period of time in the vessel 5, will be changed in such a way that comparatively less volatile hydrocarbons will be formed from the hydrogen and carbon present in the natural gas while at the same time hyrogen will be liberated from the natural gas and hydrocarbon gases, which are more volatile than was the original natural gas, will also be formed. After this molecular rearrangement of the elemental constituents of the natural gas has taken place in the vessel 5, the resulting liquid and gases will be passed through the remainder of the process, as has been described, for the purpose of recovering the desirable products which will have been thus produced.

While I have described in considerable detail one method of carrying out my new process, it is to be understood that I do not intend that I shall be limited by these details, but intend to claim all novelty which is inherent in my invention. While it is my intention to apply my new process principally to the purpose of manufacturing gasoline from natural gas, I may use the process to manufacture other hydrocarbon liquids and I may also process other hydrocarbon gases. In some cases I will manufacture a heavy hydrocarbon liquid similar to crude petroleum.

What I claim and desire to secure by Letters Patent is:

1. The process for converting hydrocarbon gas into compratively non-volatile hydrocarbon liquid, which comprises compressing such a gas to a pressure in excess of 500 pounds per square inch, continuously feeding said compressed gas through a heating zone maintained at a temperature above 750° F., maintaining the gas in said heated and compressed state for a time sufficient to convert a portion of the gas into liquid hydrocarbons, separating the resulting mixture into fixed gas, gasoline and a hydrocarbon fluid heavier than said fixed gas and lighter than said gasoline, releasing the fixed gas substantially constantly from the process, returning the hydrocarbon fluid for admixture with the fresh hydrocarbon gas, and withdrawing gasoline from the process.

2. The process for converting hydrocarbon gas into comparatively non-volatile hydrocarbon liquid, which comprises compressing such a gas to a pressure in excess of 500 pounds per square inch, continuously feeding said compressed gas through a heating zone maintained at a temperature above 750° F., maintaining the gas in said heated and compressed state for a time sufficient to convert a portion of the gas into liquid hydrocarbons, separating the resulting mixture into fixed gas, gasoline and hydrocarbon fluid heavier than said fixed gas and lighter than said gasoline, releasing the fixed gas substantially constantly from the process, withdrawing gasoline from the process, and returning the hydrocarbon fluid for reprocessing in the same cycle.

3. The process for converting hydrocarbon gas into comparatively non-volatile hydrocarbon liquid, which comprises compressing such a gas to a pressure in excess of 500 pounds per square inch, continuously feeding said compressed gas through a heating zone maintained at a temperature above 750° F., maintaining the gas in said heated and compressed state for a time sufficient to convert a portion of the gas into liquid hydrocarbons, separating the resulting mixture into fixed gas, gasoline and hyrocarbon vapors heavier than said fixed gas and lighter than said gasoline, releasing the fixed gas substantially constantly from the process, returning the hydrocarbon vapors for admixture with the fresh hydrocarbon gas, and withdrawing gasoline from the process.

4. The process for converting hydrocarbon gas into comparatively non-volatile hydrocarbon liquid, which comprises compressing such a gas to a pressure in excess of 500 pounds per square inch, continuously feeding said compressed gas through a heating zone maintained at a temperature above 750° F., maintaining the gas in said heated and compressed state for a time sufficient to convert a portion of the gas into liquid hydrocarbons, separating the resulting mixture into fixed gas, gasoline and hydrocarbon vapors heavier than said fixed gas and lighter than said gasoline, releasing the fixed gas substantially constantly from the process, withdrawing gasoline from the process, and returning the hydrocarbon vapors for reprocessing in the same cycle.

5. The process of converting hyrocarbon materials which are normally gaseous at atmospheric pressure and temperature into normally liquid hydrocarbon materials comprising treating said gaseous materials, while under pressure preferably in excess of 500 pounds per square inch and at a temperature preferably in excess of 750° F. and maintaining said material in such heated and compressed state for a time, sufficient to convert said gaseous material into a mixture of liquid, fixed gas and a material intermediate of liquid and fixed gas, withdrawing liquid, removing fixed gas and further processing intermediate material in a similar treatment.

6. The process for converting hydrocarbon gas into comparatively non-volatile hydrocarbon liquid, which comprises compressing such a gas to a pressure preferably in excess of 500 pounds per square inch, continuously feeding said compressed gas through a heating zone maintained at a temperature preferably in excess of 750° F., maintaining the gas in heated and compressed state for a time sufficient to convert a portion of the gas into liquid hydrocarbons, separating the resulting mixture into gas, gasoline and hydrocarbon vapors heavier than said gas and lighter than said gasoline, releasing gas substantially constantly from the process, withdrawing gasoline from the process, and further processing the hydrocarbon vapors in a similar treatment, for the purpose specified.

MALCOLM P. YOUKER.